(12) United States Patent
Tang et al.

(10) Patent No.: US 11,686,094 B2
(45) Date of Patent: Jun. 27, 2023

(54) BONDING ADHESIVE AND ADHERED ROOFING SYSTEMS PREPARED USING THE SAME

(71) Applicant: Holcim Technology Ltd, Zug (CH)

(72) Inventors: Jiansheng Tang, Westfield, IN (US); Joseph Carr, Indianapolis, IN (US)

(73) Assignee: Holcim Technology Ltd, Zug (CH)

( * ) Notice: Subject to any disclaimer, the term of this patent is extended or adjusted under 35 U.S.C. 154(b) by 0 days.

(21) Appl. No.: 17/557,331

(22) Filed: Dec. 21, 2021

(65) Prior Publication Data

US 2022/0112721 A1 Apr. 14, 2022

Related U.S. Application Data

(63) Continuation of application No. 16/731,545, filed on Dec. 31, 2019, now abandoned, which is a continuation-in-part of application No. 15/985,028, filed on May 21, 2018, now abandoned, and a continuation of application No. 15/226,243, filed on Aug. 2, 2016, now Pat. No. 10,550,575, and a continuation-in-part of application No. 15/036,907, filed on May 16, 2016, now abandoned, said application No. 15/985,028 is a continuation of application No. 14/776,791, filed as application No. PCT/US2014/066101 on Nov. 18, 2014, now abandoned, said application No. 15/226,243 is a continuation of application No. 14/215,344, filed as application No. PCT/US2014/030257 on Mar. 17, 2014, now abandoned.

(60) Provisional application No. 62/800,079, filed on Feb. 1, 2019, provisional application No. 61/905,405, filed on Nov. 18, 2013, provisional application No. 61/786,794, filed on Mar. 15, 2013, provisional application No. 61/786,794, filed on Mar. 15, 2013.

(51) Int. Cl.

| | | |
|---|---|---|
| C09J 183/00 | (2006.01) |
| E04D 5/14 | (2006.01) |
| C09J 109/00 | (2006.01) |
| E04D 11/00 | (2006.01) |
| C09J 175/04 | (2006.01) |
| C08G 65/336 | (2006.01) |
| C09D 171/02 | (2006.01) |
| C09J 171/00 | (2006.01) |
| E04D 3/36 | (2006.01) |
| E04D 7/00 | (2006.01) |
| B32B 7/12 | (2006.01) |
| B32B 11/04 | (2006.01) |
| B32B 25/16 | (2006.01) |
| B32B 37/12 | (2006.01) |
| C09J 5/00 | (2006.01) |
| C09J 201/02 | (2006.01) |
| C09J 201/10 | (2006.01) |
| E04D 5/08 | (2006.01) |
| E04D 11/02 | (2006.01) |
| E04D 12/00 | (2006.01) |
| E04D 15/04 | (2006.01) |

(52) U.S. Cl.
CPC ............ *E04D 5/148* (2013.01); *B32B 7/12* (2013.01); *B32B 11/044* (2013.01); *B32B 25/16* (2013.01); *B32B 37/12* (2013.01); *C08G 65/336* (2013.01); *C09D 171/02* (2013.01); *C09J 5/00* (2013.01); *C09J 109/00* (2013.01); *C09J 171/00* (2013.01); *C09J 175/04* (2013.01); *C09J 201/02* (2013.01); *C09J 201/10* (2013.01); *E04D 3/36* (2013.01); *E04D 5/08* (2013.01); *E04D 7/005* (2013.01); *E04D 11/00* (2013.01); *E04D 11/02* (2013.01); *E04D 12/00* (2013.01); *B32B 2255/26* (2013.01); *B32B 2307/728* (2013.01); *B32B 2319/00* (2013.01); *B32B 2395/00* (2013.01); *B32B 2419/06* (2013.01); *C09J 2499/00* (2013.01); *E04D 2015/042* (2013.01)

(58) Field of Classification Search
CPC ........ C09J 183/00; C09J 183/16; E04D 5/148
See application file for complete search history.

(56) References Cited

U.S. PATENT DOCUMENTS

| | | | |
|---|---|---|---|
| 4,657,958 A | 4/1987 | Fieldhouse et al. |
| 4,732,925 A | 3/1988 | Davis |
| 4,778,852 A | 10/1988 | Futamura |
| 4,810,565 A | 3/1989 | Wasitis et al. |
| 5,389,715 A | 2/1995 | Davis et al. |
| 5,556,636 A | 9/1996 | Yano et al. |
| 5,849,133 A | 12/1998 | Senderling et al. |
| 6,101,767 A | 8/2000 | Georgeau |

(Continued)

FOREIGN PATENT DOCUMENTS

| | | |
|---|---|---|
| EP | 1462500 A1 | 9/2004 |
| JP | 2009-029972 A | 2/2009 |

(Continued)

OTHER PUBLICATIONS

International Search Report for related Application No. PCT/US2014/030257 dated Sep. 17, 2014.

*Primary Examiner* — Margaret G Moore
(74) *Attorney, Agent, or Firm* — Arthur M. Reginelli; Renner, Kenner

(57) ABSTRACT

A method is provided for forming an adhered membrane roof system that meets Factory Mutual (FM) 4470/4474 standards for wind uplift. The method comprises applying a bond adhesive to a substrate on a roof to form an adhesive layer and applying a membrane directly to the adhesive layer. The bond adhesive includes a moisture-curable polymer.

20 Claims, 1 Drawing Sheet

(56) References Cited

U.S. PATENT DOCUMENTS

| | | | |
|---|---|---|---|
| 6,120,869 A | 9/2000 | Cotsakis et al. | |
| 6,183,551 B1 | 2/2001 | Okamoto et al. | |
| 6,502,360 B2 | 1/2003 | Car, III et al. | |
| 6,505,455 B1 | 1/2003 | Georgeau | |
| 6,679,018 B2 | 1/2004 | Georgeau et al. | |
| 6,803,412 B2 | 10/2004 | Nguyen-Misra et al. | |
| 7,019,074 B2* | 3/2006 | Nakamura | C08G 65/336 |
| | | | 525/63 |
| 7,101,628 B2 | 9/2006 | Peng | |
| 7,175,732 B2 | 2/2007 | Robison et al. | |
| 7,189,781 B2 | 3/2007 | Acevedo et al. | |
| 7,285,588 B2 | 10/2007 | O'Rourke et al. | |
| 7,399,801 B2 | 7/2008 | Tsuji et al. | |
| 7,422,791 B2 | 9/2008 | Klosowski et al. | |
| 7,671,144 B2 | 3/2010 | Fujimoto et al. | |
| 7,767,308 B2* | 8/2010 | Georgeau | C09J 161/06 |
| | | | 428/524 |
| 7,772,301 B2 | 8/2010 | Fensel et al. | |
| 8,071,666 B2 | 12/2011 | Barthel et al. | |
| 8,088,940 B2* | 1/2012 | Huang | C07F 7/1804 |
| | | | 556/407 |
| 8,158,731 B2 | 4/2012 | Stefanisin et al. | |
| 8,809,479 B2 | 8/2014 | Huang et al. | |
| 9,534,158 B2 | 1/2017 | Fujimoto et al. | |
| 9,593,200 B2 | 3/2017 | Tanaka | |
| 9,969,843 B2 | 5/2018 | Harumashi et al. | |
| 2003/0075262 A1 | 4/2003 | Hein et al. | |
| 2004/0214950 A1* | 10/2004 | Nakamura | C08L 71/02 |
| | | | 525/88 |
| 2005/0107499 A1 | 5/2005 | Georgeau et al. | |
| 2006/0205907 A1 | 9/2006 | Guyer | |
| 2006/0292945 A1* | 12/2006 | Kuhn | B32B 27/12 |
| | | | 442/41 |
| 2007/0088137 A1* | 4/2007 | Georgeau | C09J 175/04 |
| | | | 525/487 |
| 2007/0282080 A1 | 12/2007 | Kawakami et al. | |
| 2008/0237537 A1* | 10/2008 | Huang | C07F 7/1804 |
| | | | 556/407 |
| 2008/0292902 A1 | 11/2008 | Reid | |
| 2009/0255201 A1* | 10/2009 | Kraus, Jr. | B29C 44/326 |
| | | | 52/309.4 |
| 2009/0318599 A1 | 12/2009 | Brokamp | |
| 2010/0317796 A1 | 12/2010 | Huang et al. | |
| 2011/0173910 A1* | 7/2011 | Franklin | B32B 27/32 |
| | | | 428/41.5 |
| 2012/0040191 A1 | 2/2012 | Kohl et al. | |
| 2012/0123016 A1 | 5/2012 | Bolte et al. | |
| 2015/0284610 A1 | 10/2015 | Zander et al. | |
| 2016/0032158 A1 | 2/2016 | Tang et al. | |
| 2016/0340905 A1 | 11/2016 | Tang et al. | |
| 2016/0362893 A1 | 12/2016 | Tang et al. | |

FOREIGN PATENT DOCUMENTS

| | | |
|---|---|---|
| JP | 2010-106159 A | 5/2010 |
| WO | 200037534 A1 | 6/2000 |
| WO | 2014145482 A2 | 9/2014 |

* cited by examiner

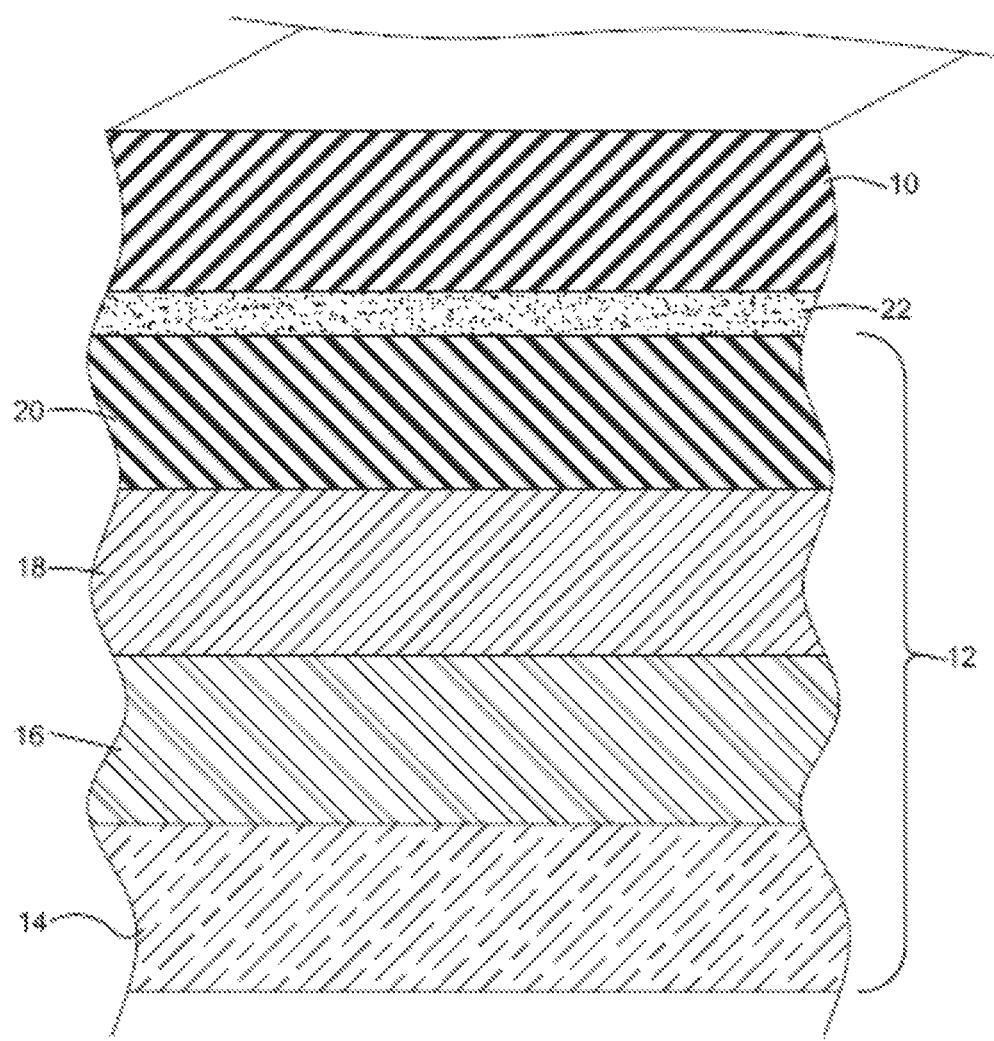

BONDING ADHESIVE AND ADHERED ROOFING SYSTEMS PREPARED USING THE SAME

This application is:

a continuation of U.S. patent application Ser. No. 16/731,545, now abandoned, filed on Dec. 31, 2019, which is a continuation-in-part of U.S. patent application Ser. No. 15/226,243, now U.S. Pat. No. 10,550,575, filed on Aug. 2, 2016, which is a continuation of U.S. patent application Ser. No. 14/215,344, now abandoned, filed Mar. 14, 2014, which claims the benefit of U.S. Provisional Application Ser. No. 61/786,794, filed Mar. 15, 2013, and a continuation-in-part of U.S. patent application Ser. No. 15/985,028, now abandoned, filed on May 21, 2018, which is a continuation of U.S. patent application Ser. No. 14/776,791, now abandoned, filed Sep. 15, 2015, which is a 371 National Phase Application of PCT/2014/030257, filed on Mar. 17, 2014, which claims the benefit of U.S. Provisional Application Ser. No. 61/786,794, filed Mar. 15, 2013, and a continuation-in-part of U.S. patent application Ser. No. 15/036,907, now abandoned, filed on May 16, 2016, which is a 371 National Phase Application of PCT/US14/66101, filed on Nov. 18, 2014, which claims the benefit of U.S. Provisional Application Ser. No. 61/905,405, filed Nov. 18, 2013, and claims the benefit of U.S. Provisional Application Ser. No. 62/800,079, filed Feb. 1, 2019.

FIELD OF THE INVENTION

Embodiments in the invention are directed toward a silicon-containing bonding adhesive and adhered roofing systems prepared with the adhesive.

BACKGROUND OF THE INVENTION

Polymeric membranes, such as cured sheets of ethylene-propylene-diene copolymer rubber (EPDM) or extruded sheets of thermoplastic olefins (TPO), are often used in the construction industry to cover flat or low-sloped roofs. These membranes, which may also be referred to as panels, are typically delivered to a construction site in a bundled roll, transferred to the roof, and then unrolled and positioned. The sheets are then affixed to the building structure by employing varying techniques such as mechanical fastening, ballasting, and/or adhesively adhering the membrane to the roof. The roof substrate to which the membrane is secured may include a variety of materials depending on the situation. For example, the surface may be a concrete, metal, or wood deck, it may include insulation, cover or recover board, and/or it may include an existing membrane.

In addition to securing the membrane to the roof—which mode of attachment primary seeks to prevent wind uplift—the individual membrane panels, together with flashing and other accessories, are positioned and adjoined to achieve a waterproof barrier on the roof. Typically, the edges of adjoining panels are overlapped, and these overlapping portions are adjoined to one another through a number of methods depending upon the membrane materials and exterior conditions. One approach involves providing adhesives or adhesive tapes between the overlapping portions, thereby creating a water-resistant seal.

Thus, there are two modes of membrane attachment that are used in conjunction. The first seeks to anchor the membrane to the roof, while the second seeks to create a water-impervious barrier by attaching individual adjacent membrane panels to each other or to flashing. Inasmuch as these modes of membrane attachment seek entirely different goals, the mechanisms by which they operate are likewise distinct.

Adhesive attachment is typically employed to form adhered roofing systems. The membrane may be adhered to the roof substrate substantially across the entire planar surface of the membrane to form fully-adhered systems. In other words, a majority, if not all, of the membrane panel is secured to the roof substrate as opposed to mechanical attachment methods which can only achieve direct attachment in those locations where a mechanical fastener actually affixes the membrane. Fully-adhered roofing systems are advantageously installed where maximum wind uplift prevention is desired. Also, fully-adhered systems are desirable in re-roofing situations, especially where the new membrane is placed over an existing membrane (a technique that is commonly referred to as re-skinning).

Several techniques are employed to prepare fully-adhered roofing systems. One technique includes the use of a fleece-backed EPDM membrane that is secured to the substrate by using a low-rise polyurethane foam adhesive that is sprayed over the substrate. Once the adhesive polyurethane foam is applied, the fleece-backed membrane is applied to the adhesive layer, which attaches itself to the fleece backing. Alternatively, nitrile-based bond adhesives can be applied to the substrate and the fleece-backed EPDM membrane can be secured thereto. Because these systems require fleece-backed membranes, they are expensive and suffer from manufacturing inefficiencies relating to the need to secure the fleece to the membrane.

Other techniques employ conventional EPDM membrane sheet, which is not modified with a fleece backing. In these situations, it is common to employ a contact bonding method whereby technicians coat both the membrane and the substrate that receives the membrane with an adhesive. The adhesive is then typically allowed to at least partially set to, among other things, build some wet green strength. The membrane is then mated with the substrate via the partially-set adhesive, which may include, for example, a polychloroprene-based adhesive. Because the volatile components (e.g. solvent) of the adhesives are "flashed off" prior to mating, good, early (green) bond strength can advantageously be developed.

While the use of known solvent-based adhesives has proven versatile to the extent that the substrate need not be porous and cold-weather application is feasible, the technique requires application of the adhesive to both the substrate and the membrane, followed by a time delay to allow the solvent to flash off, and then a mating of the two adhesive surfaces (i.e., the adhesive coated membrane is mated to the adhesive coated membrane).

Other techniques employ a water-borne bond adhesive that is applied to the substrate and then the EPDM membrane can be applied to the adhesive layer. While this attachment technique has proven useful, the use is generally limited to ambient weather conditions (e.g. greater than 40° C.) and/or in conjunction with porous substrates that absorb water thereby allowing the adhesive to dry or cure without blistering the membrane.

In yet other situations, 100% solids bond adhesives are employed. For example, U.S. Pat. No. 7,767,308 teaches a moisture-curable bond adhesive that includes a polymer or a combination of polymers having silicon-containing hydrolyzable terminal groups, a phenolic resin, and a non-polymeric silicon-containing hydrolyzable compound. While these bond adhesives are touted for being free of volatile organic compounds (VOCs), safe for chronic exposure, and non-flammable, and yet provide a high initial peel strength and/or high peel strength upon being fully cured between a roof substrate and a rubber membrane, it would nonetheless be desirable to formulate a bond adhesive that does not include a phenolic resin. These bond adhesives preferably include moisture scavengers such as vinyl-trimethoxysilanes, which are generally referred to as chemical moisture scavengers. It is believed that these moisture scavengers are included in the system to provide useful shelf life and prevent premature curing.

While both solvent-based and water-based adhesives may be used as contact adhesives, solvent-based bonding adhesives offer advantages. For example, the flash-off period, which is the time required to allow solvent evaporation prior to mating, can be between 5 and 40 minutes, and is less susceptible to environmental conditions, such as temperature, than water-based adhesive systems. Solvent-based systems, on the other hand, can be problematic. For example, the solvent employed in the system can cause membrane swelling and/or blistering. It is believed swelling and blistering results from solvent compatibility with the membrane and/or a component of the membrane. Other problems can include blushing, which is the formation of condensation on the surface of the film formed upon application of the adhesive to the membrane. Blushing can have a deleterious impact on the bond strength and/or quality of the bond formed by the adhesive and is therefore not desirable.

The evaporation of solvents can be problematic, especially as the desire to minimize release of volatile organic compounds increases.

Weather conditions can limit the applicability of current adhesives. Guidelines for current adhesive compositions require an installation temperature of greater than 40° F. At lower temperatures, current adhesives may be too viscous to spread properly. There is therefore a desire for a bond adhesive that overcomes this temperature limitation and allows fully-adhered roofing systems to be installed at lower temperatures.

Thus, both water-borne and solvent-borne systems known in the art today have limitations, and there is therefore a desire for a bond adhesive that overcomes these advantages.

SUMMARY OF THE INVENTION

One or more embodiments of the present invention provide a method for forming an adhered membrane roof system, the method comprising applying a bond adhesive to a substrate on a roof to form an adhesive layer, where the bond adhesive includes a polymer having a silicon-containing hydrolyzable terminal group and a hydrocarbon tackifier resin devoid of phenolic resin; and applying a membrane directly to the adhesive layer.

Other embodiments of the present invention provide a method for forming an adhered membrane roof system, the method comprising applying a bond adhesive to a substrate on a roof to form an adhesive layer, where the bond adhesive includes a polymer having a silicon-containing hydrolyzable terminal group, and a low VOC-generating moisture scavenger; and applying a membrane directly to the adhesive layer.

Other embodiments of the present invention provide a method for forming an adhered membrane roof system, the method comprising applying a bond adhesive to a substrate on a roof to form an adhesive layer, where the bond adhesive includes a polymer having a silicon-containing hydrolyzable terminal group, and a low VOC-generating moisture scavenger; and applying a membrane directly to the adhesive layer

BRIEF DESCRIPTION OF THE DRAWINGS

The FIGURE is a cross sectional view of a roofing system including EPDM membrane adhered to a substrate using an adhesive according to one or more embodiments of the present invention.

DETAILED DESCRIPTION OF ILLUSTRATIVE EMBODIMENTS

Embodiments of the invention are based, at least in part, on the discovery of a bond adhesive composition that includes a polymer having a silicon-containing hydrolyzable terminal group, and that can be used in fully adhered roofing membrane systems to bond polymeric substrates (e.g. roofing membranes) to other substrates (e.g., isocyanate construction boards). And, these roofing membranes need not be fleece-backed membranes.

Indeed, fully-adhered systems that advantageously meet FM 4470/4474 standards for wind uplift can be prepared in the absence of a fleece backing. Moreover, it has been unexpectedly discovered that these adhered systems can be mated to a variety of substrates including existing membranes, which thereby provides a unique method for re-roofing or re-skinning an existing roof. Additionally, the adhesives of this invention can be used to prepare fully-adhered roofing systems by simply applying the adhesive to the substrate, and then subsequently mating the membrane to the adhesive layer formed on the substrate without the need to directly apply the adhesive to the membrane. Still further, it has been advantageously discovered that the adhesive composition of the invention can be prepared to have relatively low dynamic viscosity, which advantageously allows the adhesive to be spread at relatively high rates of coverage while maintaining technologically useful adhesive properties. Moreover, adhesive compositions of certain embodiments can advantageously be prepared with thixotropic agents that provide the adhesive with relatively high static viscosity, which likewise improves coverage rates by limiting the amount of adhesive absorption in the substrate.

Advantageously, embodiments of the invention provide a bond adhesive composition that includes a hydrocarbon tackifier resin, and that may be devoid or substantially devoid of phenolic resins.

In these or other embodiments of the invention, the bond adhesive composition may include a low VOC-generating moisture scavenger. In one or more embodiments, these adhesives are advantageously stable due to the presence of a moisture scavenger, and yet they do not release appreciable amounts of volatile compounds, such as methanol, after application to the roof surface. While the prior art teaches the use of similar bond adhesives with conventional moisture scavengers for similar applications, it has now unexpectedly been discovered that the moisture scavengers employed in the prior art, such as vinyl-trimethoxysilanes, give rise to problems when employed to secure a polymeric membrane to a roof surface. Specifically, it has now been discovered that the by-products of hydrolysis (e.g. methanol) liberated from the moisture scavengers employed in the prior art bond adhesives give rise to blistering (i.e., separation between the substrate and the membrane resulting from gas pockets), which in turn deleteriously impacts the performance of the membrane. Discovery of this problem and the use of the moisture scavengers described herein provide improved roofing systems.

In one or more embodiments of the invention, the bond adhesive composition may include an adhesion promoter that produces a reduced amount of volatile organic compound compared to that produced by conventional silane adhesion promoters.

In one or more embodiments of the invention, the bond adhesive composition may include a non-phthalate plasticizer. The bond adhesive compositions advantageously maintain a relatively low viscosity at low temperatures, which effectively widens the temperature window that the adhesive composition may be used.

Adhesive Composition

As discussed above, the adhesive compositions of this invention includes a polymer having a silicon-containing hydrolyzable terminal group. The adhesive composition may further include one or more of a tackifier resin, a moisture scavenger, an adhesion promoter, a filler, a catalyst, an antioxidant, a stabilizer, a crosslink inhibitor (a.k.a. retarder), a plasticizer, and a thixotropic compound. In one or more embodiments, the adhesive composition is a 100% solids composition (i.e. it is solvent free).

Silane-Terminated Polymers

In one or more embodiments, the polymer having silicon-containing hydrolyzable terminal group may include a silane-terminate polymer, which may also be referred to as silyl-terminated polymer. The term "silicon-containing hydrolyzable terminal group" as used herein means a group wherein at least one silicon atom is combined with a hydrolyzable group, such as a methoxy group, which is subject to hydrolysis and polymerization by moisture.

The backbone of the polymer having silicon-containing hydrolyzable terminal groups may be comprised of polyethers, polyesters, polyurethanes (SPUR), or other suitable backbones.

Suitable polymers having silicon-containing hydrolyzable terminal groups are commercially available and/or can be prepared in accordance with techniques known in the art. Examples of suitable commercially available polymers having silicon-containing hydrolyzable terminal groups are Geniosil™ STP-E 35 trimethoxysilylpropyl-carbamate-terminated polyether, and Geniosil™ STP-E 30 silane-terminated polyether with dimethoxy(methyl)silylmethylcarbamate terminal groups, both of which are available from Wacker Chemical. Another commercially available polymer having silicon-containing hydrolyzable terminal groups that may be employed in the adhesive compositions of this invention is "SPUR+" silane-terminated polyurethanes, which are available from Momentive. Another suitable commercially available material is "MS" silyl-terminated polyether (S227H, S303, S327, S303H, SAX350), which are available from Kaneka.

While the use of a hydrocarbon resin within the adhesive compositions of the present invention provide the composition with an advantageous dynamic viscosity, further adjustments to viscosity can be advantageously accomplished, while maintaining adequate adhesion, by employing certain blends of polymers having silicon-containing hydrolyzable terminal groups. In particular embodiments, these blends include polymers having a relatively high molecular weight combined with polymers having a relatively low molecular weight. In one or more embodiments, the high molecular weight polymers having a silicon-containing hydrolyzable terminal group have a number average molecular weight greater than 12,000 g/mole, in other embodiments greater than 13,000 g/mole, in other embodiments greater than 14,000 g/mole, and in other embodiment greater than 14,000 g/mole. In one or more embodiments, the high molecular weight polymers having a silicon-containing hydrolyzable terminal group have a number average molecular weight of from about 12,000 to 30,000, in other embodiments from about 13,000 to about 25,000, and in other embodiments from about 14,000 to about 20,000 g/mole. In these or other embodiments, the high molecular weight polymers having a silicon-containing hydrolyzable terminal group are characterized by a polydispersity of from about 1.5 to about 4.0, in other embodiments from about 1.8 to about 3.5, and in other embodiments from about 2.0 to about 3.0.

In these or other embodiments, low molecular weight polymers having a silicon-containing hydrolyzable terminal group have a number average molecular weight of less than 12,000 g/mole, in other embodiments less than 11,000 g/mole, and in other embodiments less than 10,000 g/mole. In one or more embodiments, the low molecular weight polymers having a silicon-containing hydrolyzable terminal group have a number average molecular weight of from about 5,000 to 12,000, in other embodiments from about 7,000 to about 11,000, and in other embodiments from about 8,000 to about 10,000 g/mole. In these or other embodiments, the low molecular weight polymers having a silicon-containing hydrolyzable terminal group are characterized by a polydispersity of from about 1.1 to about 3.0, in other embodiments from about 1.2 to about 2.5, and in other embodiments from about 1.3 to about 2.0.

Tackifier Resin

In one or more embodiments, the adhesive composition includes one or more tackifier resins. Examples of tackifier resins include hydrocarbon resins and phenolic resins.

In particular embodiments, the tackifier resin is a hydrocarbon resin. In one or more embodiments, the hydrocarbon resins may include natural resins, synthetic resins, and low molecular weight polymers or oligomers. The monomer that may be polymerized to synthesize the synthetic resins or low molecular weight polymers or oligomers may include those obtained from refinery streams containing mixtures or various unsaturated materials or from pure monomer feeds. The monomer may include aliphatic monomer, cycloaliphatic monomer, aromatic monomer, or mixtures thereof. Aliphatic monomer can include $C_4$, $C_5$, and $C_6$ paraffins, olefins, and conjugated diolefins. Examples of aliphatic monomer or cycloaliphatic monomer include butadiene, isobutylene, 1,3-pentadiene (piperylene) along with 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Aromatic monomer can include $C_8$, $C_9$, and $C_{10}$ aromatic monomer. Examples of aromatic monomer include styrene, indene, derivatives of styrene, derivatives of indene, and combinations thereof.

In one or more embodiments, examples of hydrocarbon resins include aliphatic hydrocarbon resins, at least partially hydrogenated aliphatic hydrocarbon resins, aliphatic/aromatic hydrocarbon resins, at least partially hydrogenated aliphatic aromatic hydrocarbon resins, cycloaliphatic hydrocarbon resins, at least partially hydrogenated cycloaliphatic resins, cycloaliphatic/aromatic hydrocarbon resins, at least partially hydrogenated cycloaliphatic/aromatic hydrocarbon resins, at least partially hydrogenated aromatic hydrocarbon resins, polyterpene resins, terpene-phenol resins, rosin esters, and mixtures of two or more thereof.

In certain embodiments, the synthetic aliphatic or aromatic hydrocarbon resins may be characterized by a number average molecular weight ($M_n$) of from about 300 g/mole to about 3,000 g/mole, and in other embodiments from about 500 g/mole to about 2,000 g/mole. These hydrocarbon resins may also be characterized by a weight average molecular weight ($M_w$) of from about 500 g/mole to about 6,000 g/mole, and in other embodiments from about 700 g/mole to about 5,000 g/mole. Molecular weight may be determined by size exclusion chromatography (SEC) by using a Waters 150 gel permeation chromatograph equipped with the differential refractive index detector and calibrated using polystyrene standards.

In certain embodiments, the hydrocarbon resins include those produced by thermal polymerization of dicyclopentadiene (DCPD) or substituted DCPD, which may further include aliphatic or aromatic monomers. In one embodiment, the DCPD or substituted DCPD is copolymerized with aromatic monomer, and the final product includes less than 10% aromatic content. In another embodiment, the hydrocarbon resin derives from the copolymerization of both aliphatic monomer and aromatic monomer. In particular embodiments, the dicyclopentadiene tackifier resin is hydrogenated. Hydrogenated dicyclopentadiene tackifier resins are commercially available from Neville.

In one or more embodiments, synthetic oligomers may include dimers, trimers, tetramers, pentamers, hexamers, septamers, and octamers of petroleum distillate monomer. In one or more embodiments, this petroleum distillate monomer may have a boiling point of from about 30° to about 210° C. The oligomers may include byproducts of resin polymerization including thermal and catalytic polymerization. For example, oligomers may derive from processes where DCPD, aliphatic monomer, and/or aromatic monomer are oligomerized.

The hydrocarbon resins may be characterized by an aromatic content of from about 1 to about 60, in other embodiments from about 2 to about 40, and in other embodiments from about 5 to about 10. In one or more embodiments, the tackifier resins are hydrogenated or partially hydrogenated; useful resins include those that are at least 50 percent, in other embodiments at least 80 percent, in other embodiments at least 95 percent, and in other embodiments at least 99 percent or fully hydrogenated. For example, the hydrocarbon resin prior to grafting may contain less than 90, in other embodiments less than 50, in other embodiments less than 25, in other embodiments less than 10, in other embodiments less than 2, in other embodiments less than 1, in other embodiments less than 0.5, and in other embodiments less than 0.05 olefinic protons. Aromatic content and olefin content may be measured by $^1$H-NMR as measured directly from the $^1$H NMR spectrum from a spectrometer with a field strength greater than 300 MHz, and in other embodiments 400 MHz (frequency equivalent). Aromatic content includes the integration of aromatic protons versus the total number of protons. Olefin proton or olefinic proton content includes the integration of olefinic protons versus the total number of protons.

In one or more embodiments, the hydrocarbon resin may be characterized by a softening point of from about 5° C. to about 210° C., in other embodiments from about 65° C. to about 170° C., and in other embodiments from about 90° C. to about 140° C. Softening point can be determined according to ASTM E-28 (Revision 1996).

In these or other embodiments, the hydrocarbon resin may be characterized by a glass transition temperature of less than 120° C., in other embodiments less than 110° C., and in other embodiment from about −40° C. to about 80° C. Glass transition temperature may be determined according to ASTM D 341-88 by using differential scanning calorimetry.

In these or other embodiments, the hydrocarbon resin may be characterized by a Saponification number (mg KOH/g resin material) of greater than 10, in other embodiments greater than 15, and in other embodiments greater than 19.

In these or other embodiments, the hydrocarbon resin may be characterized by an acid number greater than 10, in other embodiments greater than 15, and in other embodiments greater than 20, and in other embodiments greater than 25.

Phenolic Resin

In particular embodiments, the tackifier resin is a phenolic resin. In one or more embodiments, the phenolic resins that may be employed in the compositions of this invention include resol-type and/or novolac-type phenolic resins obtained by condensation reaction of phenolic compounds, e.g., phenol, cresol, xylenol, resorcinol, an alkylphenol, and a modified phenol such as cashew nut shell oil modified phenol or tall oil modified phenol, with aldehyde compounds, e.g., formaldehyde and paraformaldehyde; and nitrogen-containing phenol resins obtained by condensation reaction of the above-mentioned phenolic compounds and aldehyde compounds in the presence of a catalyst such as ammonia or an amine compound. The phenol resins may be employed alone or in admixture. In one or more embodiments, the term phenolic resin refers to a phenol-formaldehyde resin. For example, the term phenolic resin may include a novolac resin, which is a phenol-formaldehyde resin where the molar ratio of the formaldehyde to phenol is less than one. These resins are typically synthesized by using an acid catalyst. The term phenolic resin also refers to resol resins wherein the molar ratio of the formaldehyde to phenol is greater than one. These resins are typically synthesized by using a base catalyst.

Adhesion Promoter

In one or more embodiments, the adhesive compositions can include one or more adhesion promoters, also referred to as silane coupling agents.

In one or more embodiments, the adhesion promoter includes a non-polymeric silicon-containing hydrocarbon compound that has a lower molecular weight than the polymer having a silicon-containing hydrolysable group (i.e. the silane-terminate polymer). Also, the adhesion promoter includes at least one hydrolyzable group capable of reacting with a hydrolyzed functional group on the polymer having silicon-containing hydrolyzable terminal groups, and includes at least one moiety capable of interacting (i.e., promoting adhesion) with materials that are to be bonded with one another (such as a rubber membrane material). The expression non-polymeric, as used to modify the silicon-containing hydrocarbon compound is meant to exclude polymers and copolymers having at least 10 repeat units or monomeric units, such as urethane prepolymers having silicon-containing hydrolyzable terminal groups, but is meant to encompass oligomeric silicon-containing hydrolyzable compounds having fewer than 10 repeat units or monomers, and which are useful for promoting adhesion between a substrate and a cured adhesive composition.

Suitable adhesion promoters include those having an alkoxysilyl, a ketoximesilyl, or an alkenoxysilyl group as the hydrolyzable group, and exemplary such compositions include vinyltris(2-methoxyethoxy) silane, 3-methacryloxypropyltrimethoxysilane, 2-(3,4-epoxycyclohexyl)ethyl trimethoxysilane, 3-glycidoxypropyltrimethoxysilane, 3-glycidoxypropylmethyldiethoxysilane, N-(2-aminoethyl)

3-aminopropyltrimethoxysilane, 3-aminopropyltriethoxysilane, 3-(N-aminomethylbenzylamino) propyltrimethoxysilane, 3-mercaptopropyltrimethoxysilane, 3-aminopropyltris (methylethylketoxime) silane, 3-glycidoxy propyltriisopropenoxysilane, and 3-glycidoxypropylmethyldiisopropenoxysilane. In certain embodiments, the adhesion promoter is 3-aminopropyltriethoxysilane (i.e. 3-(trimethoxysilyl)propylamine).

In one or more embodiments of the invention, the bond adhesive composition may include an adhesion promoter that produces a reduced amount of volatile organic compound compared to that produced by conventional silane adhesion promoters. Adhesion promoters that produce a reduced amount of volatile organic compound compared to that produced by conventional silane adhesion promoters may be referred to as low VOC-generating adhesion promoters. Low VOC-generating adhesion promoters are described, for example, in U.S. Patent Application Pub. Nos. 2006/0205907 A1 and 2008/0237537 A1, both of which are incorporated by reference herein.

Examples of low VOC-generating adhesion promoters include silanes of the general formula:

$$[Y[-G(-SiX_u Z^b_v Z^c_w)_s]_r]_n \quad \text{(Formula 1)}$$

wherein each occurrence of G is independently a polyvalent group derived from the substitution of one or more hydrogen atoms of an alkyl, alkenyl, aryl or aralkyl group, or a group obtained by removal of one or more hydrogen atoms of a heterocarbon, with G containing from about 1 to about 30 carbon atoms; each occurrence of X is independently —Cl, —Br, $R^1O$—, $R^1C(=O)O$—, hydroxycarboxylicacids, $R^1R^2C=NO$—, $R^1R^2NO$— or $R^1R^2N$—, —$R^1$, —$(OSiR^1R^2)_t(OSiR^1R^2R^3)$, and —$O(R^{10}CR^{11})_fOH$, wherein each occurrence of $R^1$, $R^2$, $R^3$, $R^{10}$, and $R^{11}$ is independently R; each occurrence of $Z^b$ is independently selected from the group consisting of $(-O-)_{0.5}$, $[-O(R^{10}CR^{11})_fO-]_{0.5}$, $[-NR^4-L^1-NR^5-]_{0.5}$, $[-OC(=O)R^{10}CR^{11}C(=O)O-]_{0.5}$ except succinic, maleic or phthalic acid, an alkanolamine or an acetylenic glycol where these groups form bridging bonds between silicon atom centers, wherein each occurrence of $R^{10}$ and $R^{11}$ is independently R and each occurrence of $L^1$ is independently G; each occurrence of $Z^C$ is independently selected from the group consisting of —$O(R^{10}CR^{11})_fO$—, —$NR^4-L^1-NR^5$—, —$OC(=O)$ $R^{10}CR^{11}C(=O)O$—except succinic, maleic or phthalic acid, an alkanolamine or an acetylenic glycol where these groups form cyclic bonds with a silicon atom center, wherein each occurrence of $R^{10}$ and $R^{11}$ is independently R and each occurrence of $L^1$ is independently G; each occurrence of R is hydrogen, straight alkyl, cyclic alkyl, branched alkyl, alkenyl, aryl, aralkyl, an ether, polyether, or a group obtained by removal of one or more hydrogen atoms of a heterocarbon; each occurrence of R contains from 1 to about 20 carbon atoms; each occurrence of the subscript f is an integer of from 1 to about 15; each occurrence of n is an integer of from 1 to about 100, with the proviso that when n is greater than 1; v is greater than 0 and all of the valences for $Z^b$ have a silicon atom bonded to them; each occurrence of the subscript u is an integer of from 0 to about 3; each occurrence of the subscript v is an integer of from 0 to about 3; each occurrence of the subscript w is an integer of from 0 to about 1, with the proviso that u+v+2w=3; each occurrence of the subscript r is an integer of from 1 to about 6; each occurrence of the subscript t is an integer of from 0 to about 50; each occurrence of the subscript s is an integer of from 1 to about 6; each occurrence of Y is an organofunctional group of valence r; and at least one cyclic and bridging organofunctional silane comprising the cyclic and bridging organofunctional silane composition containing at least one occurrence of $Z^b$ or $Z^c$.

In one or more embodiments, the low VOC-generating adhesion promoter may be prepared by reaction of an aminoalkylalkoxysilane with an alkane diol. For example, in one or more embodiments, a silane useful as a low VOC-generating adhesion promoter may be prepared by the transesterification of 3-aminopropyltriethoxysilane with 2-methyl-1,3-propanediol.

Plasticizers

In one or more embodiments, examples of a plasticizer include phthalic acid esters (such as dioctyl phthalate, diisooctyl phthalate, dibutyl phthalate, diundecyl phthalate, diisononyl phthalate, diisodecyl phthalate, diisodocecyl phthalate and butylbenzyl phthalate); aliphatic dibasic acid esters (such as dioctyl adipate, isodecyl succinate, and dibutyl sebacate); glycol esters (such as diethylene glycol dibenzoate and pentaerythritol ester); aliphatic esters (such as butyl oleate and methyl acetylricinoleate); phosphoric acid esters (such as tricresyl phosphate, trioctyl phosphate, and octyldiphenyl phosphate); epoxy plasticizers (such as epoxidated soybean oil, epoxidated linseed oil, and benzyl epoxystearate); polyester plasticizers (such as polyesters of dibasic acid and a divalent alcohol); polyethers (such as polypropylene glycol and its derivatives); polystyrenes (such as poly-α-methylstyrene and polystyrene); polybutadiene butadiene-acrylonitrile copolymer; polychloroprene; polyisoprene; polybutene; chlorinated paraffins; benzoic esters; glycol esters; phosphoric esters; sulfonic esters; and mixtures thereof, wherein any given compound is different than an ingredient otherwise included in the composition of the invention.

In addition, high-molecular weight plasticizers can also be used. Specific examples of such high-molecular weight plasticizer include, but are not limited to, vinyl polymers obtainable by polymerizing a vinyl monomer by various methods; polyalkylene glycol esters such as diethyl ene glycol dibenzoate, triethylene glycol dibenzoate and pentaerythritol esters; polyester plasticizers obtainable from a dibasic acid, such as sebacic acid, adipic acid, azelaic acid or phthalic acid, and a dihydric alcohol, such as ethylene glycol, diethylene glycol, triethylene glycol, propylene glycol or dipropylene glycol; polyethers such as polyether polyols, e.g. polyethylene glycol, polypropylene glycol and polytetramethylene glycol that have a molecular weight of 500 or more, and even further 1,000 or more, and derivatives of these as obtainable by converting the hydroxyl groups of these polyether polyols to an ester, ether or the like groups; polystyrenes such as polystyrene and poly-α-methylstyrene; polybutadiene, polybutene, polyisobutylene, butadiene-acrylonitrile, polychloroprene and the like. In one or more specific embodiments, plasticizers include propylene glycol dibenzoate, diisononyl phthalate, and soy methyl esters, Mesamol II, HB-40, butylbenzylphthalate. In other specific embodiments, the plasticizers employed are phthalic acid esters. In one or more embodiments, the plasticizers may include high boiling solvents that promote tackification, lowering of viscosity, and sprayability.

In one or more embodiments, the plasticizer is a non-phthalic plasticizer. In one or more embodiments, the plasticizer is a glycol ether ester. In one or more embodiments, glycol ether esters may be prepared from glycol ethers, for example by reaction with carboxylic acids, carboxylic acid chlorides, anhydrides and inorganic acids. In one or more embodiments, the plasticizer may be prepared by reacting a glycol ether and a carboxylic acid. In one or more embodiments, the glycol ether may be represented by the formula R'OH, and the carboxylic acid may be represented by the formula R"COOH, where R' is a monovalent organic group that includes at least one ether linkage, and R" is a monovalent organic group.

Examples of carboxylic acids include formic acid, acetic acid, propionic acid, butyric acid, benzoic acid, pentanoic acid, hexanoic acid, heptanoic acid, octanoic acid, nonanoic acid, decanoic acid, diacids including butanedioic acid, pentaedioic acid, hexanedioic acid, heptanedioic acid, octanedioic acid, nonanedioic acid, and decanedioic acid, and combinations and isomers thereof.

Glycol ethers include alkyl ethers of ethylene glycol or propylene glycol. In one or more embodiments, glycol ethers may be prepared by reacting an alcohol (e.g., methanol, ethanol, propanol, butanol, or hexanol) with ethylene oxide or propylene oxide. Glycol ethers are sometimes classified as e-series and p-series glycol ethers, where the "e" and "p" indicate that the glycol ether was derived from ethylene oxide or propylene oxide, respectively.

Examples of glycol ethers include 2-methoxyethanol (also known as ethylene glycol monomethyl ether, with a chemical formula of $CH_3OCH_2CH_2OH$), 2-ethoxyethanol (also known as ethylene glycol monoethyl ether, with a chemical formula of $CH_3CH_2OCH_2CH_2OH$), 2-propoxyethanol (also known as ethylene glycol monopropyl ether, with a chemical formula of $CH_3CH_2CH_2OCH_2CH_2OH$), 2-isopropoxyethanol (also known as ethylene glycol monoisopropyl ether, with a chemical formula of $(CH_3)_2CHOCH_2CH_2OH$), 2-butoxyethanol (also known as ethylene glycol monobutyl ether, with a chemical formula of $CH_3CH_2CH_2CH_2OCH_2CH_2OH$), 2-phenoxyethanol (also known as ethylene glycol monophenyl ether, with a chemical formula of $C_6H_5OCH_2CH_2OH$), 2-benzyloxyethanol (also known as ethylene glycol monobenzyl ether, with a chemical formula of $C_6H_5CH_2OCH_2CH_2OH$), 1-methoxy-2-propanol (also known as propylene glycol methyl ether, with a chemical formula of $CH_3OCH_2CH(OH)CH_3$), 2-(2-methoxyethoxy)ethanol (also known as diethylene glycol monomethyl ether or methyl carbitol, with a chemical formula of $CH_3OCH_2CH_2OCH_2CH_2OH$), 2-(2-ethoxyethoxy)ethanol (also known as diethylene glycol monoethyl ether or carbitol cellosolve, with a chemical formula of $CH_3CH_2OCH_2CH_2OCH_2CH_2OH$), 2-(2-butoxyethoxy)ethanol (also known as diethylene glycol mono-n-butyl ether or butyl carbitol, with a chemical formula of $CH_3CH_2CH_2CH_2OCH_2CH_2OCH_2CH_2OH$), dipropyleneglycol methyl ether, and combinations, complexes, and isomers thereof. In one or more embodiments, the glycol ether is bis[2-(2-butoxyethoxy) ethoxy]methane.

Examples of non-phthalic plasticizers also include methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutylacetate, diethylene glycol diacetate, dipropylene glycol dibutyrate, hexylene glycol diacetate, glycol diacetate, methyl glycol acetate, ethyl glycol acetate, butyl glycol acetate, ethyl diglycol acetate, butyl diglycol acetate, diethylene glycol dibenzoate, triethylene glycol dibenzoate, and ethyl-3-ethoxypropionate.

In one or more embodiments, the non-phthalic plasticizer may include a glycol ether. Useful glycol ethers include those describe above with reference to the glycol esters. In this regard, the discussion above with respect to glycol ethers is incorporated herein.

In one or more embodiments, the non-phthalic plasticizer may be characterized by a weight average molecular weight of greater than 100, in other embodiments, greater than 110, in other embodiments, greater than 120. In one or more embodiments, non-phthalic plasticizer may be characterized by a weight average molecular weight of less than 1000, in other embodiments, less than 900, in other embodiments, less than 800. In one or more embodiments, non-phthalic plasticizer may be characterized by a weight average molecular weight of from about 100 to about 1000, in other embodiments, from about 110 to about 900, in other embodiments, from about 120 to about 800.

In one or more embodiments, the non-phthalic plasticizer is a liquid at room temperature and at standard pressure, and may be characterized by a boiling point of greater than 100° F., in other embodiments, greater than 150° F., in other embodiments, greater than 200° F. In one or more embodiments, non-phthalic plasticizer may be characterized by a boiling point of less than 600° F., in other embodiments, less than 550° F., in other embodiments, less than 500° F. In one or more embodiments, non-phthalic plasticizer may be characterized by a boiling point of from about 100 to about 600° F., in other embodiments, from about 150 to about 550, in other embodiments, from about 200 to about 500, all of the above measured at atmospheric pressure.

Non-phthalic plasticizers are commercially available, for example from Hallstar Industrial under the trade name Plasthall 190.

Advantageously, phthalate plasticizers, which include phthalic acid esters such as dioctyl phthalate, diisooctyl phthalate, dibutyl phthalate, diundecyl phthalate, diisononyl phthalate, diisodecyl phthalate, diisodocecyl phthalate and butylbenzyl phthalate, may be reduced or eliminated from the adhesive composition.

Moisture Scavenger

In one or more embodiments, a moisture scavenger is employed in the adhesive compositions of this invention. Moisture scavengers that may be employed include chemical moisture scavengers and physical moisture scavengers that absorb and/or adsorb moisture. Examples of chemical moisture scavengers include vinyl-trimethoxysilane. An example of a physical moisture scavenger that may be employed is 3A Sieves from UOP, which is a zeolite having 3 Angstrom pores capable of trapping moisture. Other examples of moisture scavengers include oxazoladines and calcium oxide.

As suggested above, a low VOC-generating moisture scavenger may be employed within the adhesive compositions of the present invention. In one or more embodiments, these moisture scavengers are silanes including at least one organo functional group and at least one hydrolyzable group that, upon hydrolysis, generates a non-volatile organic compound or low vapor volatile organic compound (e.g., a glycol or other polyhydric alcohol of relatively high boiling point and/or low vapor pressure). Useful moisture scavenger compounds are described in U.S. Pat. No. 8,088,940, which is incorporated herein by reference.

In one or more embodiments, the moisture scavengers can be defined by the formula

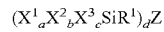

where each occurrence of $R^1$ is independently a chemical bond between a silicon atom and a carbon atom of the Z group; a hydrocarbyl group of 1 to 10 carbon atoms; or a heterocarbyl of 1 to 10 carbon atoms and at least one heteroatom of nitrogen or oxygen; each occurrence of $X^1$ is a monovalent alkyl or aryl group of from 1 to 6 carbon atoms or a monovalent heterocarbyl group of from 2 to 8 carbon atoms and at least two heteroatom selected from the group consisting of oxygen and nitrogen, with the proviso that one heteroatom is bonded to a carbon atom of the heterocarbyl group and to the silicon atom; each occurrence of $X^2$ is a divalent heterocarbyl group of from 2 to 8 carbon atoms and at least two heteroatoms selected from the group consisting of oxygen and nitrogen, with the proviso that two heteroatoms are bonded to two different carbon atoms of the heterocarbyl group and to the same silicon atom; each occurrence of $X^3$ is a trivalent heterocarbyl group of from about 3 to 8 carbons and at least three heteroatoms selected from the group consisting of oxygen and nitrogen, with the proviso that three heteroatoms are bonded to three different carbon atoms of the heterocarbyl group and to the same silicon atom; each Z is a monovalent or polyvalent organofunctional group of valence d selected from the group consisting of hydrogen, amino, carbamato, epoxy, ureido and alkenyl groups, provided, where Z does not possess a carbon atom, $R^1$ cannot be a chemical bond; and, each occurrence of a, b, c and d are integers, wherein a is 0 to 3; b is 0 or 1; c is 0 or 1; and d is 1 to 4; with the proviso that when c is 0, then a+2b=3 and when b is 1, then a=1 and c=0.

In one or more embodiments, the moisture scavenger is a glycoxysilane moisture scavenger. In particular embodiments, the glycoxysilane moisture scavenger may be defined by the formula:

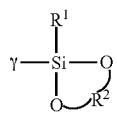

where $R^1$ is a monovalent organic group, $R^2$ is a divalent organic group, and γ is an electron donating group. In particular embodiments, $R^1$ is a hydrocarbyl group. In other embodiments, $R^1$ is a hydrocarbyloxy group. In one or more embodiments, γ is a vinyl group.

In one or more embodiments, the monovalent organic groups of the glycoxysilane may be hydrocarbyl groups, which include, but not limited to, alkyl, cycloalkyl, alkenyl, cycloalkenyl, aryl, allyl, aralkyl, alkaryl, or alkynyl groups. Hydrocarbyl groups also include substituted hydrocarbyl groups, which refer to hydrocarbyl groups in which one or more hydrogen atoms have been replaced by a substituent such as a hydrocarbyl group. In one or more embodiments, these groups may include from one, or the appropriate minimum number of carbon atoms to form the group, to about 20 carbon atoms. These groups may or may not contain heteroatoms. Suitable heteroatoms include, but not limited to, nitrogen, boron, oxygen, silicon, sulfur, tin, and phosphorus atoms. In one or more embodiments, the cycloalkyl, cycloalkenyl, and aryl groups are non-heterocyclic groups. In these or other embodiments, the substituents forming substituted hydrocarbyl groups are non-heterocyclic groups.

In one or more embodiments, the moisture scavenger may be 3A Sieves from UOP, which is a zeolite having 3 Angstrom pores capable of trapping.

In one or more embodiments, the monovalent organic groups of the glycoxysilane may be hydrocarbyloxy groups which include, but are not limited to, alkoxy, cycloalkoxy, substituted cycloalkoxy, alkenyloxy, cycloalkenyloxy, substituted cycloalkenyloxy, aryloxy, allyloxy, substituted aryloxy, aralkyloxy, alkaryloxy, or alkynyloxy groups. Substituted hydrocarbyloxy groups include hydrocarbyloxy groups in which one or more hydrogen atoms attached to a carbon atom have been replaced by a substituent such as an alkyl group. In one or more embodiments, the hydrocarbyloxy groups may include from one, or the appropriate minimum number of carbon atoms to form the group, to 20 carbon atoms. The hydrocarbyloxy groups may contain heteroatoms such as, but not limited to nitrogen, boron, oxygen, silicon, sulfur, and phosphorus atoms.

In one or more embodiments, the divalent organic groups of the glycoxysilane may include hydrocarbylene groups such as, but not limited to, alkylene, cycloalkylene, alkenylene, cycloalkenylene, alkynylene, cycloalkynylene, or arylene groups. Hydrocarbylene groups include substituted hydrocarbylene groups, which refer to hydrocarbylene groups in which one or more hydrogen atoms have been replaced by a substituent such as a hydrocarbyl group. In one or more embodiments, these groups may include from one, or the appropriate minimum number of carbon atoms to form the group, to about 20 carbon atoms. These groups may or may not contain heteroatoms. Suitable heteroatoms include, but not limited to, nitrogen, boron, oxygen, silicon, sulfur, tin, and phosphorus atoms. In one or more embodiments, the cycloalkylene, cycloalkenylene, and arylene groups are non-heterocyclic groups. In these or other embodiments, the substituents forming substituted hydrocarbylene groups are non-heterocyclic groups.

Specific examples of glycoxysilane compounds include vinyl, methyl, 2-methyl-1,3-propanedioxy silane, which may also be referred to as 2,5-dimethyl-2-vinyl[1,2,3]dioxasilinane. These moisture scavengers are available under the tradename Y-15866 (Momentive).

Thixatrope

In one or more embodiments, suitable thixotropic agents may include, but are not limited to, polyvinylpyrrolidone, titanate coupling agents, metal soaps (such as calcium stearate, aluminum stearate, and barium stearate, aluminum distearate, and aluminum tristearate), copolymers with acidic groups, compounds having ionic groups, fumed silica, colloidal silica, asbestine, organic derivatives of castor oil (such as hydrogenated castor oil derivatives), treated clays, organic bentonite, modified polyester polyols (such as polyoxyethylene-polyoxypropylene block copolymers), aliphatic amides, and polyamides (such as polyamide waxes). Specific examples include polyamide waxes, such as "Crayvallac SLX" available from Arkema, or polymerized castor oils such as Flowtone R from Crayvalley.

Antioxidants

Antioxidants that may be employed if desired. Examples of useful antioxidants include hindered phenols and phosphate esters.

Fillers

Generally, any compatible filler, such as calcium carbonate may be employed if desired for a particular application. As the skilled person will appreciate, fillers will generally be omitted when the adhesive composition is intended to be sprayed onto one surface that is subsequently applied to a second surface on which the adhesive is or is not deposited.

Catalyst

As mentioned above, the adhesive composition may include one or more catalysts for the purpose of promoting the crosslinking the silane-terminated polymer. Without wishing to be bound by any particular theory, it is believed that these catalysts promote the hydrolysis and condensation of organosilicon compounds (i.e., reactions between the terminal groups of the polymer having silicon-containing hydrolyzable terminal groups, and reactions between the optional adhesion promoter when present and the polymer having silicon-containing hydrolyzable terminal groups). In one or more embodiments, hydrolysis of organosilicon compounds may be catalyzed by either acids or bases. Useful basic catalysts that may be employed in the compositions of this invention include alkali metal hydroxides such as potassium hydroxide, silanolates such as lithium silanolate, organic amines, and Lewis bases such as alkali metal carbonates and bicarbonates. Suitable acid catalysts include mineral acids such as sulfuric and phosphoric acids, organic acids such as acetic, propanoic and methane sulfonic acids. Other suitable acid catalysts include Lewis acids such as aluminum chloride, organotin compounds such as dibutyl tin dilaurate and titanium compounds such as the alkyl ortho esters, including tetrabutyl titanate.

Solvent

As mentioned above, the adhesive composition is devoid or substantially devoid of a solvent. As used herein, the term solvent refers to a volatile liquid that is either a VOC or VOC exemption liquid. Examples of solvents that are excluded include toluene and acetone.

Amounts

Silane-Terminated Polymer

In one or more embodiments, the adhesive compositions of the invention include at least 25 wt. %, in other embodiments at least 30 wt. %, and in other embodiments at least 35 wt. % silane-terminated polymer, based upon the entire weight of the adhesive composition. In these or other embodiments, the adhesive compositions of the invention include at most 80 wt. %, in other embodiments at most 75 wt. %, and in other embodiments at most 70 wt. % silane-terminated polymer, based upon the entire weight of the adhesive composition. In one or more embodiments, the adhesive compositions of the invention include from about 25 wt. % to about 80 wt. %, in other embodiments from about 30 wt. % to about 75 wt. %, and in other embodiments from about 35 wt. % to about 70 wt. % silane-terminate polymer, based upon the entire weight of the adhesive composition.

In one or more embodiments, the silane-terminated polymer component of the adhesive compositions of the present invention may, in one or more embodiments, include a blend of high and low molecular weight polymer, based upon the entire weight of the adhesive composition. In one or more embodiments, the silane-terminated polymer component includes at least 40 wt. %, in other embodiments at least 50 wt. %, and in other embodiments at least 60 wt. % high-molecular weight silane-terminated polymer (e.g., a molecular weight of greater than 12,000 g/mole), based upon the entire weight of the silane-terminated polymer component. In these or other embodiments, the silane-terminated polymer component includes at most 100 wt. %, in other embodiments at most 80 wt. %, and in other embodiments at most 70 wt. % high-molecular weight silane-terminated polymer, based upon the entire weight of the silane-terminated polymer component. In one or more embodiments, the silane-terminated polymer component of the adhesive compositions includes from about 40 wt. % to about 100 wt. %, in other embodiments from about 50 wt. % to about 80 wt. %, and in other embodiments from about 60 wt. % to about 70 wt. % high-molecular weight silane-terminated polymer, based upon the entire weight of the silane-terminated polymer component.

In one or more embodiments, the silane-terminated polymer component includes at least 0 wt. %, in other embodiments at least 20 wt. %, and in other embodiments at least 30 wt. % low-molecular weight silane-terminated polymer (a molecular weight of less than 12,000 g/mole), based upon the entire weight of the silane-terminated polymer component. In these or other embodiments, the silane-terminated polymer component includes at most 60 wt. %, in other embodiments at most 50 wt. %, and in other embodiments at most 40 wt. % low-molecular weight silane-terminated polymer, based upon the entire weight of the silane-terminated polymer component. In one or more embodiments, the silane-terminated polymer component of the adhesive compositions includes from about 0 wt. % to about 60 wt. %, in other embodiments from about 20 wt. % to about 50 wt. %, and in other embodiments from about 30 wt. % to about 40 wt. % low-molecular weight silane-terminated polymer, based upon the entire weight of the silane-terminated polymer component.

Tackifier Resin

In one or more embodiments, the adhesive compositions of the invention include at least 1 wt. %, in other embodiments at least 3 wt. %, and in other embodiments at least 5 wt. % tackifier resin (e.g., hydrocarbon resin or phenolic resin), based upon the entire weight of the adhesive composition. In these or other embodiments, the adhesive compositions of the invention include at most 30 wt. %, in other embodiments at most 25 wt. %, and in other embodiments at most 20 wt. % tackifier resin, based upon the entire weight of the adhesive composition. In one or more embodiments, the adhesive compositions of the invention include from about 1 wt. % to about 30 wt. %, in other embodiments from about 3 wt. % to about 25 wt. %, and in other embodiments from about 5 wt. % to about 20 wt. % tackifier resin, based upon the entire weight of the adhesive composition.

Adhesion Promoters

In one or more embodiments, the adhesive compositions of the invention include at least 1 wt. %, in other embodiments at least 1.5 wt. %, and in other embodiments at least 2 wt. % adhesion promoter, based upon the entire weight of the adhesive composition. In these or other embodiments, the adhesive compositions of the invention include at most 10 wt. %, in other embodiments at most 9 wt. %, and in other embodiments at most 8 wt. % adhesion promoter, based upon the entire weight of the adhesive composition. In one or more embodiments, the adhesive compositions of the invention include from about 1 wt. % to about 10 wt. %, in other embodiments from about 1.5 wt. % to about 9 wt. %, and in other embodiments from about 2 wt. % to about 8 wt. % wt. adhesion promoter, based upon the entire weight of the adhesive composition.

Catalyst

In one or more embodiments, the adhesive compositions of the invention include at least 0.05 wt. %, in other embodiments at least 0.1 wt. %, and in other embodiments at least 0.15 wt. % catalyst, based upon the entire weight of the adhesive composition. In these or other embodiments, the adhesive compositions of the invention include at most 3 wt. %, in other embodiments at most 2.5 wt. %, and in other embodiments at most 2 wt. % catalyst, based upon the entire weight of the adhesive composition. In one or more embodiments, the adhesive compositions of the invention include from about 0.05 wt. % to about 3 wt. %, in other embodiments from about 0.1 wt. % to about 2.5 wt. %, and in other embodiments from about 0.15 wt. % to about 2 wt. % catalyst, based upon the entire weight of the adhesive composition.

Thixatrope

In one or more embodiments, the adhesive compositions of the invention include at least 0 wt. %, in other embodiments at least 0 wt. %, and in other embodiments at least 0 wt. % thixatrope, based upon the entire weight of the adhesive composition. In these or other embodiments, the adhesive compositions of the invention include at most 6 wt. %, in other embodiments at most 5 wt. %, and in other embodiments at most 4 wt. % thixatrope, based upon the entire weight of the adhesive composition. In one or more embodiments, the adhesive compositions of the invention include from about 0 wt. % to about 6 wt. %, in other embodiments from about 0 wt. % to about 5 wt. %, and in other embodiments from about 0 wt. % to about 4 wt. % thixatrope, based upon the entire weight of the adhesive composition.

Moisture Scavenger

In one or more embodiments, the adhesive compositions of the invention include at least 0.25 wt. %, in other embodiments at least 0.5 wt. %, and in other embodiments at least 0.75 wt. % moisture scavenger, based on the entire weight of the composition. In these or other embodiments, the adhesive compositions of the invention include at most 5 wt. %, in other embodiments at most 4 wt. %, and in other embodiments at most 3 wt. % moisture scavenger, based on the entire weight of the composition. In one or more embodiments, the adhesive compositions of the invention include from about 0.25 wt. % to about 5 wt. %, in other embodiments from about 0.5 wt. % to about 4 wt. %, and in other embodiments from about 0.75 wt. % to about 3 wt. % moisture scavenger, based on the entire weight of the composition.

Fillers

In one or more embodiments, the adhesive compositions of the invention include at least 0 wt. %, in other embodiments at least 0 wt. %, and in other embodiments at least 0 wt. % filler, based upon the entire weight of the adhesive composition. In these or other embodiments, the adhesive compositions of the invention include at most 65 wt. %, in other embodiments at most 60% wt., and in other embodiments at most 55 wt. % filler, based upon the entire weight of the adhesive composition. In one or more embodiments, the adhesive compositions of the invention include from about 0 wt. % to about 65 wt. %, in other embodiments from about 0 wt. % to about 60 wt. %, and in other embodiments from about 0 wt. % to about 55 wt. % filler, based upon the entire weight of the adhesive composition.

Antioxidants

In one or more embodiments, the adhesive compositions of the invention include at least 0.1 wt. %, in other embodiments at least 0.15 wt. %, and in other embodiments at least 0.2% wt. % antioxidant, based upon the entire weight of the adhesive composition. In these or other embodiments, the adhesive compositions of the invention include at most 3%, in other embodiments at most 2.5 wt. %, and in other embodiments at most 2% wt. % antioxidant, based upon the entire weight of the adhesive composition. In one or more embodiments, the adhesive compositions of the invention include from about 0.1 wt. % to about 3 wt. %, in other embodiments from about 0.15 wt. % to about 2.5 wt. %, and in other embodiments from about 0.15 wt. % to about 2 wt. % antioxidant, based upon the entire weight of the adhesive composition.

Plasticizer

In one or more embodiments, the adhesive compositions of the invention include at least 5 wt. %, in other embodiments at least 10 wt. %, and in other embodiments at least 15 wt. % plasticizer, based upon the entire weight of the adhesive composition. In these or other embodiments, the adhesive compositions of the invention include at most 65 wt. %, in other embodiments at most 60 wt. %, and in other embodiments at most 55 wt. % plasticizer, based upon the entire weight of the adhesive composition. In one or more embodiments, the adhesive compositions of the invention include from about 5 wt. % to about 65 wt. %, in other embodiments from about 10 wt. % to about 60 wt. %, and in other embodiments from about 15 wt. % to about 55 wt. % plasticizer, based upon the entire weight of the adhesive composition.

Advantageously, phthalate plasticizers may be reduced or eliminated from the adhesive composition. In one or more embodiments, the compositions of this invention include less than 5 wt. %, in other embodiments, less than 3 wt. %, in other embodiments, less than 1 wt. %, in other embodiments, less than 0.5 wt. %, and in other embodiments less than 0.1 wt. % of any phthalate plasticizer, based upon the entire weight of the adhesive composition.

Solvent

As discussed above, the adhesive compositions of the invention may advantageously be 100 wt. % solids compositions, based upon the entire weight of the adhesive composition. In one or more embodiments, the compositions may be devoid of solvent, based upon the entire weight of the adhesive composition. In these or other embodiments, the adhesive compositions are substantially devoid of solvents, which refers to that amount of solvent or less that will not have an appreciable impact on the composition. In one or more embodiments, the compositions of this invention include less than 10 wt. %, in other embodiments less than 8 wt. %, and in other embodiments less than 5 wt. % solvent, based upon the entire weight of the adhesive composition.

Phenolic Resin

As discussed above, the adhesive compositions of particular embodiments are devoid or substantially devoid of phenolic resin, based upon the entire weight of the adhesive composition. In one or more embodiments, the compositions may be devoid of phenolic resin, based upon the entire weight of the adhesive composition. In these or other embodiments, the adhesive compositions are substantially devoid of phenolic resin, which refers to that amount of solvent or less that will not have an appreciable impact on the, based upon the entire weight of the adhesive composition. In one or more embodiments, the compositions of this invention include less than 3 wt. %, in other embodiments less than 2 wt. %, and in other embodiments less than 1 wt. % phenolic resin, based upon the entire weight of the adhesive composition.

Preparation of Adhesive

The adhesive compositions of the present invention may be prepared by batch mixing using conventional batch mixing equipment. In one or more embodiments, the mixer may be equipped with an emulsifier. The mixing can take place under atmospheric pressure and at room temperature. The ingredients can conveniently be introduced to the mixer by first introducing the silane-terminate polymer followed by introduction of the other ingredients. Mixing may continue until desired viscosity or level of dispersion/solubility is achieved. In particular embodiments, mixing is conducted for at least 100 minutes, in other embodiments at least 150 minutes, in other embodiments at least 180 minutes, and in other embodiments at least 190 minutes.

The adhesive compositions of this invention may be formulated as either one-part or two-part compositions. In the case of one-part compositions, the composition may be free of water, and contains a moisture scavenger as discussed above. In the case of a two part composition that is combined at the point of use, one part may contain a small amount of water to initiate moisture curing and components that are not sensitive to moisture, whereas the other part may contain components that are sensitive to moisture such as adhesion promoters and more reactive polymers having silicon-containing hydrolyzable terminal groups.

Characteristics of Adhesive Composition

In one more embodiments, the adhesive composition is formulated to offer various characteristics that are advantageous in practicing the present invention.

In one or more embodiments, the adhesive composition is characterized by an advantageous dynamic viscosity. While the skilled person will appreciate that the static viscosity of the adhesive can be increased through the use of thixotropic agents, the dynamic viscosity is generally equivalent to the baseline viscosity of the adhesive composition. In other words, the thixotropic agents do not serve to drop the dynamic viscosity below that of the baseline viscosity. In one or more embodiments, the dynamic viscosity of the adhesive compositions of this invention, as measured by using a Brookfield viscometer equipped with a #6 spindle operating at room temperature and 10 rpm, is less than 20,000 cPs, in other embodiments less than 18,000 cPs, in other embodiments less than 17,000 cPs, in other embodiments less than 16,000 cPs, in other embodiments less than 15,000 cPs, in other embodiments less than 14,000 cPs, in other embodiments less than 13,000 cPs, and in other embodiments less than 11000 cPs. In one or more embodiments, the dynamic viscosity of the adhesive compositions of this invention is from about 3,000 to 20,000 cPs, in other embodiments from about 3,300 to 18,000 cPs, in other embodiments from about 4,000 to 16,000 cPs, in other embodiments from about 4,500 to 15,000 cPs, and in other embodiments from about 4,500 to about 11,000 cPs.

In one or more embodiments, the adhesive compositions of the present invention are characterized by an advantageous static viscosity, which may be measured by a Brookfield viscometer equipped with a #6 spindle operating at room temperature and 2 rpm. In one or more embodiments, the static viscosity of the adhesive composition is at least 24,000 cPs, in other embodiments at least 22,000 cPs, and in other embodiments, at least 20,000 cPs. In one or more embodiments, the static viscosity of the adhesive composition is from about 3600 to about 24,000 cPs, in other embodiments from about 4000 to about 22,000 cPs, and in other embodiments, from about 4600 to about 20,000 cPs.

Applicants have advantageously discovered that the relatively high static viscosity of the adhesive compositions of this invention give rise to several advantages including higher coverage rates while maintaining useful adhesion. These higher coverage rates stem from the low absorption of the adhesive composition into the substrate. In one or more embodiments, where the substrate includes a polyisocyanurate insulation board having a glass-reinforced paper facer, the absorption of the adhesive material into the facer and/or foam insulation board is, on a weight basis, less than 60%, in other embodiments less than 55%, in other embodiments less than 50%, and in other embodiments less than 45%.

In one or more embodiments, the adhesive compositions of this invention when used to bond EPDM rubber sheet material to a high density particleboard have generally exhibited a peel strength of at least 2.5-4 pounds per linear inch (pli) after 30 day ambient cure. However, the thermosetting reactions in these compositions substantially improve with time and temperature. In one or more embodiments, after 30 days curing at 150 degrees Fahrenheit (normal rooftop conditions) peel strengths as high as 7.8 pli were obtained.

INDUSTRIAL APPLICABILITY

In one or more embodiments, the adhesive composition of the present invention may be employed as a adhesive in roofing applications. In particular embodiments, the adhesive may be employed to fully secure a membrane panel to a substrate on a roof deck. In particular embodiments, the adhesive may be employed in preparing a fully-adhered roofing membrane system. In other embodiments, the adhesive may be used for securing membrane panel or flashing to vertical surfaces within a roofing system.

Practice of the present invention is not necessarily limited by the selection of a particular roofing membrane that is secured to a substrate on a roof surface. As is known in the art, numerous roofing membranes have been proposed in the art and several are used commercially including thermoset and thermoplastic roofing membranes. Commercially available thermoplastic roofing membranes may include polyvinyl chloride, or polyolefin copolymers. For example, thermoplastic olefin (TPO) membranes are available under the trade names UltraPly™, and ReflexEON™ (Firestone Building Products). Commercially available thermoset roofing membranes may include elastomeric copolymers such as ethylene-propylene-diene copolymer (EPDM) rubber and functionalized olefins such as chlorosulfonated polyethylene (CSPE). For example, EPDM membranes are available under the trade name RubberGard™, RubberGard Platinum™, RubberGard EcoWhite™, and RubberGard MAX™ (Firestone Building Products). Useful EPDM membrane is disclosed in, for example, U.S. Pat. Nos. 7,175,732, 6,502,360, 6,120,869, 5,849,133, 5,389,715, 4,810,565, 4,778,852, 4,732,925, and 4,657,958, which are incorporated herein by reference. EPDM membranes are commercially available from a number of sources; examples include those available under the tradenames RubberGard (Firestone Building Products) and SURE-SEAL (Carlisle SynTec).

In particular embodiments, EPDM membranes are employed. As is known in the art, EPDM membrane panels include vulcanized or cured rubber compositions. These compositions may include, in addition to the rubber that is ultimately vulcanized, fillers, processing oils, and other desired ingredients such as plasticizers, antidegradants, adhesive-enhancing promoters, etc., as well as vulcanizing agents such as sulfur or sulfur-donating compounds.

In one or more embodiments, the EPDM roofing panels have a thickness in accordance with ASTM D-4637-04. In one or more embodiments, the EPDM roofing panels have a thickness of at least 45 mil±10%, in other embodiments at least 60 mil±10%, and in other embodiments at least 90 mil±10%. In these or other embodiments, the EPDM roofing panels may have a thickness of less than 65 mil±10%, in other embodiments less than 80 mil±10%, and in other embodiments less than 110 mil±10%.

In one or more embodiments, the bonding adhesive may be applied to at least a portion of a membrane panel or flashing to form a wet film of the composition on at least a portion of the membrane. In preparing a fully-adhered system, substantially one side of the membrane panel is coated with the composition to form a wet film over a substantial portion of the membrane.

In other embodiments, the substrate to which the membrane panel or flashing is ultimately attached is provided with a film of the adhesive composition. In other words, the adhesive composition is applied to at least a portion of the substrate. Thus, the adhesive can be applied to one of the two mating surfaces. While it can be applied to both surfaces, it is not necessary in order to practice the present invention.

In other embodiments, the bond adhesive composition of the present invention is applied exclusively to the substrate (e.g. the roof or materials on the roof such as insulation board), and the membrane is subsequently positioned over the adhesive layer without application of the adhesive directly to the membrane.

Application Method

In one or more embodiments of this invention, an adhered roofing system is constructed by applying the adhesive composition to a roof substrate to form a layer of adhesive and then subsequently contacting a surface of an EPDM panel to the layer of adhesive disposed on the substrate. Advantageously, the process can be used to construct a roofing system meeting the standards of UL and Factory Mutual for wind uplift without the need for applying an adhesive directly to the EPDM panel being installed. Moreover, these standards can be met in the absence of a fleece or other backing material applied to the membrane.

The substrate to which the adhesive composition is applied may include a roof deck, which may include steel, concrete, and/or wood. In other embodiments, the adhesive composition may be applied to insulation materials, such as insulation boards and cover boards. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood, OSB and plywood, as well as gypsum. In yet other embodiments, the adhesive composition may be applied to existing membranes. These existing membranes may include cured rubber systems such as EPDM membranes or chlorosulfonated polyethylene, thermoplastic polymers systems such as TPO membranes or PVC membranes, or asphalt-based systems such as modified asphalt membranes and/or built roof systems. Advantageously, practice of the present invention provides adhesion to asphalt-based substrates by offering sufficient oil resistance, which is required to maintain sufficient adhesion to asphalt systems.

In one or more embodiments, the adhesive composition is applied to the substrate by dip and roll techniques, which are conventional in the art of applying adhesives to substrates and/or membrane panels. In other embodiments, the adhesive composition is applied to the substrate by spraying. In one or more embodiments, the spraying may be accomplished by using airless spray equipment or air-assisted spray equipment. In one or more embodiments, the adhesive composition is atomized during the spraying operation. Useful spraying equipment is known in the art, such as the spray equipment available from Graco and Garlock. In other embodiments, the adhesive can be applied by a power roller, where the adhesive is pumped to the roller head. Examples include power rollers as supplied by Garlock. In yet other embodiments, the adhesive can be applied by using a drop spreader, which generally includes gravity feeding of the adhesive from a mobile platform such as that sold under the tradename BetterSpreader (Roofmaster). In one or more embodiments, the adhesive can also be applied with a squeezer.

In one or more embodiments, time is permitted between the application of the adhesive composition and application of the EPDM panel. In one or more embodiments, this time provided is less than 1 hour, in other embodiments less than 30 minutes, in other embodiments less than 10 minutes, and in other embodiments less than 3 minutes. In one or more embodiments, the time provided is from 1 minute to 1 hour.

In one or more embodiments, the wet film applied to the membrane and/or the substrate can be at least 5 mils, in other embodiments at least 7 mils, in other embodiments at least 10 mils, in other embodiments at least 13 mils, and in other embodiments at least 15 mils thick (wet film thickness). In these or other embodiments, the wet film thickness on each of the respective layers may be less than 30 mils, in other embodiments less than 25 mils, in other embodiments less than 18 mils, and in other embodiments less than 15 mils thick (wet film thickness).

It has advantageously been discovered that practice of the present invention allows for application of a thinner wet film than has been previously employed using conventional bond adhesives while achieving technologically useful bond adhesion. As a result, during use of the bond adhesive, the application rate can be reduced (i.e., less bond adhesive is needed per square foot, which translates into an increased application rate). For example, in one or more embodiments, technologically useful adhesion can be achieved at application rates of at least 50 square foot per gallon, in other embodiments at least 60 square foot per gallon, in other embodiments at least 70 square foot per gallon, in other embodiments at least 80 square foot per gallon, in other embodiments at least 90 square foot per gallon, and in other embodiments at least 100 square foot per gallon, in other embodiments at least 150 square foot per gallon, in other embodiments at least 200 square foot per gallon, and in other embodiments at least 250 square foot per gallon.

In one or more embodiments, the application of the adhesive composition is applied to the substrate in an amount sufficient to form a dried layer having a dry-film thickness of from about 3 to about 35 mils, in other embodiments from about 3 to about 20 mils, in other embodiments from about 5 to about 30 mils, in other embodiments from about 5 to about 15 mils, in other embodiments from about 7 to about 20, and in other embodiments from about 7 to about 12 mils.

In one or more embodiments, the EPDM panel may be applied to the adhesive layer using several known techniques. For example, the EPDM panel may be unrolled on to the adhesive layer.

Roof Construction

Aspects of the invention may be understood with reference to the FIGURE, which shows membrane 10 adhered to substrate 12. The substrate may include one or more of a roof deck 14, an insulation layer 16, a coverboard 18, and an existing membrane 20. In other words, membrane 10 may be adhered to roof deck 14, insulation layer 16, coverboard 18, or existing membrane 20. Disposed between an adhering membrane 10 to substrate 12 is a layer 22 of adhesive, which layer may be continuous or substantially continuous between membrane 10 and substrate 12 (i.e. a fully-adhered system). In one or more embodiments, the adhesive layer covers at least 20%, in other embodiments at least 30%, in other embodiments at least 40%, in other embodiments at least 50%, and in other embodiments at least 60% of the surface of the substrate. In these or other embodiments, the adhesive layer covers up to 100%, in other embodiments less than 90%, in other embodiments less than 75%, and in other embodiments less than 60% of the surface of the substrate. Notably absent from the construction of one or more embodiments is a fleece layer between membrane 10 and substrate 12. In other words, adhesive layer 22 is adhesively bonded directly to membrane 10.

In one or more embodiments, the bond between substrate 12 and membrane 10, which is formed by adhesive layer 22, can be quantified based upon standardized peel adhesion tests pursuant to ASTM D1876. In one or more embodiments, the bond between membrane 10 and substrate 12 exceeds at least 1 pli, in other embodiments at least 1.5 pli, in other embodiments at least 2.0 pli, and in other embodiments at least 2.5 pli, where the substrate may include EPDM membrane or, in other embodiments, a glass-reinforced, paper-faced polyisocyanurate insulation board. Advantageously, in one or more embodiments, the bond formed between membrane 10 and substrate 12 exceeds the pull strength limitations and/or tensile limitations of the substrate. In other words, the substrate fails under pull force (for example the facer pulls from the insulation or substrate boards) prior to the failure of adhesive layer 22.

In order to demonstrate the practice of the present invention, the following examples have been prepared and tested. The examples should not, however, be viewed as limiting the scope of the invention. The claims will serve to define the invention.

EXAMPLES

A. Table I provides the ingredients employed in making each adhesive sample, and then each sample was analyzed for static (i.e., baseline) viscosity, and also analyzed for adhesive strength using peel testing. Specifically, viscosity was measured using a Brookfield visometer using a #6 spindle operating at 10 rpm at room temperature. Peel testing was conducted using a modified ASTM D 413 test, wherein a one square foot EPDM membrane sample was adhered to a paper-faced isocyanurate insulation board in one instance, and to an EPDM membrane in the second instance. The substrates (i.e., the isocyanurate board and the EPDM) were also one square foot in size and the adhesive was applied exclusively to the substrate, and then the EPDM sample was applied to the adhesive layer. The adhesive was applied at an application rate of 100 square foot per gallon by weighing the exact amount of adhesive required to cover the substrate and then uniformly applying the adhesive to the substrate. Testing, which was done using an Instron apparatus, followed the procedures set forth in ASTM D 413. That is, 90° peels were used for the insulation board substrate and T-peels were used for the EPDM substrate.

Each sample was similarly prepared according to the following mixing procedure. The polymers containing a silicon-containing hydrolyzable terminal group, the plasticizer, and the tackifier resin were charged to a high-speed mixer equipped with a high-speed dispensing head and an outer scraping element that removed material stuck to the walls of the reactor. The mixing temperature was adjusted to 230-250° F. and mixing took place at 500 rpm for the dispenser and 9 rpm for the scraper. Once the solid material (i.e., the tackifier) was dissolved into the liquids, a vacuum was applied to remove any residual moisture. The mixing conditions, temperature, vacuum, and duration under vacuum were adjusted to achieve less than 800 ppm water. The composition was then cooled to 80° F. and mixing speeds were returned to the original mixing speed (i.e., 500 rpm). The moisture scavenger was then charged and initially mixed at the low speed (500 rpm), and then the mixing speed was increased to about 1,500 rpm for the dispensing head and 35 rpm for the scraping element. A nitrogen blanket was applied over the mixer in an effort to inhibit the introduction of moisture into the system. Following the addition of the moisture scavenger, the adhesion promoter was added and mixed using the same two-phase mixing procedure (i.e., first at 500 rpm followed by high speed mixing of 1,500 rpm). Once the adhesion promoter was blended into the system, the catalyst was added and the same two-phase mixing procedure was applied. Once all of the ingredients were added, a vacuum was again applied to the system for a short duration in an effort to remove residual moisture without volatilizing and removing an appreciable amount of the ingredients added. The composition was allowed to return to room temperature, and then samples were drawn for viscosity measurements as well as peel adhesion tests. A nitrogen blanket was maintained over the composition in order to avoid introduction of moisture.

As suggested above, Table I provides the ingredients employed in each sample, as well as the results of the peel testing and the dynamic viscosity of the adhesives.

TABLE I

| | Sample | | | | | |
|---|---|---|---|---|---|---|
| | Sample 1 | Sample 2 | Sample 3 | Sample 4 | Sample 5 | Sample 6 |
| Ingredients (grams) | | | | | | |
| Silyl-Terminated PolyetherI | 105.00 | 105.00 | — | 105.00 | 105.00 | 105.00 | 66.57 |
| Silyl-Terminated Polyurethane | 91.00 | 91.00 | — | 91.00 | 91.00 | 91.00 | — |
| Silyl-Terminated Polyether II | — | — | — | — | — | — | 53.83 |
| Silyl-Terminated Polyether III | — | — | — | — | — | — | 65.10 |
| Phthalate Plasticizer | 98.00 | 98.00 | 98.00 | 98.00 | 98.00 | 106.80 | |
| Phenolic Resin | 35.00 | — | — | — | — | — | |
| Moisture Scavenger | 4.55 | 4.55 | 4.55 | 4.55 | 4.55 | 4.55 | |
| Adhesion Promoter | 15.05 | 15.05 | 15.05 | 15.05 | 15.05 | 15.05 | |
| Catalyst | 1.40 | 1.40 | 1.40 | 1.40 | 1.40 | 1.40 | |
| Rosin Ester Tackifier | — | 35.00 | — | — | — | — | |
| Dicyclopentadiene Tackifier | — | — | 35.00 | — | — | — | |
| $C_5$ Aliphatic Tackifier | — | — | — | — | 35.00 | — | — |
| $C_9$ Aromatic Tackifier | — | — | — | — | — | 35.00 | 35.00 |
| Tests | | | | | | | |
| Brookfield viscosity (cPs) | 36,500 | Too high to measure | | 14,900 | 9,500 | 14,900 | 6,000 |
| Peel Test | | | | | | | |
| ISO substrate (pli) | 5.45 | 3.94 | 1.96 | 3.55 | 6.11 | 1.94 | |
| EPDM substrate (pli) | 2.65 | 1.50 | 2.08 | 2.52 | 2.67 | 1.48 | |

Silyl-Terminated Polyether I was characterized by a number average molecular weight of greater than about 12,000, had a polydispersity of about 2.5, and was believed to be difunctional. Silyl-Terminated Polyether II was characterized by a number average molecular weight of less than about 12,000 g/mole, a polydispersity of about 1.5, and was believed to be difunctional. Silyl-Terminated Polyether III was characterized by a number average molecular weight of great than about 12,000 g/mole, a polydispersity of about 2.0, and was believed to be difunctional. The silyl-terminated polyurethane was characterized by a number average molecular weight above about 12,000 g/mole, a polydispersity of about 2.7, and was believe to be difunctional. The moisture scavenger was a vinyl alkoxy silane. The adhesion promoter was an amino siloxane. The catalyst was an organo tin catalyst.

B. Two adhesive formulations were prepared by using the recipes provided in Table II.

TABLE II

| | Sample | |
|---|---|---|
| | 1 | 2 |
| Ingredient | | |
| Silicon-terminated polyether Blend | 52.98 wt % | 52.98 wt % |
| Plasticizer | 30.52 wt % | 30.52 wt % |
| Hydrocarbon Tackifier Resin | 10 wt % | 10 wt % |
| Antioxidant | 0.5 wt % | 0.5 wt % |
| Vinyl Trimethoxy Silane Moisture Scavenger | 1.3 wt % | — |
| Vinyl, theyl, 2-methyl-1,3-propanedioxy silane | — | 1.3 wt % |
| Adhesion Promoter | 4.3 wt % | 4.3 wt % |
| Catalyst | 0.4 wt % | 0.4 wt % |
| Analytical | | |
| Blistered Area (%) | 13.12% | 8.69% |

Generally, the silicon-terminated polyether, plasticizer, hydrocarbon resin, and antioxidant were initially charged to a mixer where they were mixed and heated to about 248° F. (120° C.) under about 12 mm mercury vacuum. The composition was then cooled below 80° F. (27° C.) and the vacuum was withdrawn. The moisture scavenger was then added and mixing was continued. The adhesion promoter was then added and mixed. Finally, the catalyst was added and mixing was continued while the vacuum was again applied. The composition was then sealed in a container and stored until use.

The two adhesive compositions were used in the following test. Test samples were prepared by employing an EPDM membrane that had been used in the field. The membrane was cleaned with cleaning solvents and cut into sample substrates that were slightly larger than one square foot. A virgin EPDM membrane was cut into sample specimens of exactly one square foot. About 38 grams of the adhesive compositions were applied to the cleaned EPDM substrates, respectively, in an area matching the exact dimensions of the virgin EPDM cut specimens. The virgin EPDM specimen was mated to the cleaned EPDM in the area covered by the adhesive, and the edges were sealed with a butyl-based taped, and the edges of the tape were caulked with a butyl-based caulk to ensure a gas tight seal around the periphery of the virgin EDPM specimen.

Following preparation of the test assemblies, the assemblies were placed into an over preheated to 200° F. (93° C.) for one week. The assemblies were examined daily for the formation of blisters, and the surface area of the blisters was recorded. Table II provides the average total surface area that blistered after one week for three samples tested on each adhesive formulation.

The results of this test clearly show that the use of conventional moisture scavengers, such as vinyl, trimethoxy silanes, contribute to membrane blistering. And, where a low VOC-generating moisture scavenger is employed, blistering can be markedly reduced.

Various modifications and alterations that do not depart from the scope and spirit of this invention will become apparent to those skilled in the art. This invention is not to be duly limited to the illustrative embodiments set forth herein.

What is claimed is:

1. A method for forming an adhered membrane roof system that meets FM 4474 standards for wind uplift, the method comprising:
   (i) applying a bond adhesive to a substrate on a roof to form an adhesive layer having a thickness of at least 5 mils and less than 30 mils, where the bond adhesive includes a silyl-terminated polymer and a hydrocarbon tackifier resin, and is devoid of phenolic resin; and
   (ii) applying a membrane directly to the adhesive layer, whereby a bond is formed between the substrate and the membrane that exceeds 1 pli, when measured according to ASTM D1876.

2. The method of claim 1, where the substrate includes a roof deck, an insulation layer, a coverboard, or a polymeric membrane.

3. The method of claim 1, where the step of applying the bond adhesive includes atomizing the adhesive and spraying the atomized adhesive onto the substrate, pumping the. adhesive through a power roller onto the substrate, gravity feeding the adhesive through a drop spreader onto the substrate, or squeezing the adhesive onto the substrate.

4. The method of claim 1, where the bond adhesive has a dynamic viscosity of less than 13,000 cPs by using a Brookfield viscometer equipped with a #6 spindle operating at room temperature and 10 rpm and a static viscosity of from about 3600 to about 24,000 cPs by using a Brookfield viscometer equipped with a #6 spindle operating at room temperature and 2 rpm, and the bond adhesive is applied to the substrate at an application rate of at least 50 square feet per gallon of bond adhesive.

5. A method for forming an adhered membrane roof system that meets FM 4474 standards for wind uplift, the method comprising:
   (i) applying a bond adhesive to a substrate on a roof at an application rate of at least 50 square feet per gallon of bond adhesive, to form an adhesive layer having a thickness of at least 5 mils and less than 30 mils, where the bond adhesive includes a silyl-terminated polymer and a low VOC-generating moisture scavenger, where the low VOC-generating moisture scavenger is a silane including at least one organo functional group and at least one hydrolysable group that, upon hydrolysis, does not generate methanol; and
   (ii) applying a membrane directly to the adhesive layer, whereby a bond is formed between the substrate and the membrane that exceeds 1 pli, when measured according to ASTM D1876.

6. The method of claim 5, where the membrane is a thermoplastic olefin or EPDM membrane.

7. The method of claim 5, where the bond adhesive is devoid of solvent.

8. The method of claim 5, where the low VOC-generating moisture scavenger is defined by the formula:

$(X^1_a X^2_b X^3_c SiR^1)_d Z$ wherein each occurrence of $R^1$ is independently a chemical bond between a silicon atom and a carbon atom of the Z group; a hydrocarbyl group of 1 to 10 carbon atoms; or a heterocarhyl of 1 to 10 carbon atoms and at least one heteroatom of nitrogen or oxygen; each occurrence of $X^1$ is a monovalent alkyl or aryl group of from 1 to 6 carbon atoms or a monovalent heterocarbyl group of from 2 to 8 carbon atoms and at least two heteroatom selected from the group consisting of oxygen and nitrogen, with the proviso that one heteroatom is bonded to a carbon atom of the heterocarbyl group and to the silicon atom; each occurrence of $X^2$ is a divalent heterocarbyl group of from 2 to 8 carbon atoms and at least two heteroatoms selected from the group consisting of oxygen and nitrogen, with the proviso that two heteroatoms are bonded to two different carbon atoms of the heterocarbyl group and to the same silicon atom; each occurrence of $X^3$ is a trivalent heterocarbyl group of from about 3 to 8 carbons arid at least three heteroatoms selected from the group consisting of oxygen and nitrogen, with the proviso that three heteroatoms are bonded to three different carbon atoms of the heterocarbyl group and to the same silicon atom; each Z is a monovalent or polyvalent organo-functional group of valence d selected from the group consisting of hydrogen, arnino, carbamato, epoxy, ureido and alkenyl groups, provided, where Z does not possess a carbon atom, $R^1$ cannot be a chemical bond; and, each occurrence of a, b, c and d are integers, wherein a is 0 to 3; b is 0 or 1; c is 0 or 1: and d is 1 to 4; with the proviso that when c is 0, then a+b=3 and when b is 1, then a=1 and c=0.

9. A method for forming an adhered membrane roof system that meets FM 4474 standards for wind uplift, the method comprising, the method comprising;
(i) applying a bond adhesive to a substrate on a roof at an application rate of at least 50 square feet per gallon of bond adhesive, to form an adhesive layer having a thickness of at least 5 mils and less than 30 mils, where the bond adhesive includes a silyl-terminated polymer, and a non-phthalate plasticizer, and where the bond adhesive has a dynamic viscosity of less than 13,000 cPs by using a Brookfield viscometer equipped with a #6 spindle operating at room temperature and 10 rpm and a static viscosity of from about 3600 to about 24,000 cPs by using a Brookfield viscometer equipped with a #6 spindle operating at room temperature and 2 rpm; and (ii) applying a membrane directly to the adhesive layer, whereby a bond is formed between the substrate and the membrane that exceeds 1 pli, when measured according to ASTM D1876.

10. The method of claim 9, where the non-phthalate plasticizer is selected from glycol ethers and glycol ether esters.

11. The method of claim 9, where the membrane is a thermoplastic olefin or EPDM membrane.

12. The method of claim 11, where the substrate includes a roof deck, an insulation layer, a coverboard, or a polymeric membrane.

13. The method of claim 12, where the step of applying the bond adhesive includes atomizing the adhesive and spraying the atomized adhesive onto the substrate, pumping the adhesive through a power roller onto the substrate, gravity feeding the adhesive through a drop spreader onto the substrate, or squeezing the adhesive onto the substrate.

14. The method of claim 5, where the moisture scavenger is a glycoxysilane.

15. The method of claim 14, where the glycoxysilane moisture scavenger may be defined by the formula:

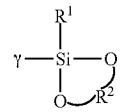

where $R^1$ is a monovalent organic group, $R^2$ is a divalent organic group, and γ is an electron donating group.

16. The method of claim 15, where $R^1$ is a hydrocarbyl group, $R^2$ is a hydrocarbylene group, and γ is a vinyl group.

17. The method of claim 5, where the bond adhesive further comprises one or more components selected from the group consisting of catalysts, tackifying agents, thixotropic compounds, plasticizers, and adhesion promoters.

18. The method of claim 1, where the membrane is a thermoplastic olefin or EPDM membrane.

19. The method of claim 1, where the bond adhesive further comprises one or more components selected from the group consisting of catalysts, moisture scavengers, thixotropic compounds, plasticizers, and adhesion promoters.

20. The method of claim 9, where the bond adhesive further comprises one or more components selected from the group consisting of catalysts, tackifying agents, thixotropic compounds, moisture scavengers, and adhesion promoters.

* * * * *